(12) United States Patent  
Soliman

(10) Patent No.: US 6,985,087 B2  
(45) Date of Patent: Jan. 10, 2006

(54) METHOD AND APPARATUS FOR WIRELESS REMOTE TELEMETRY USING AD-HOC NETWORKS

(75) Inventor: Samir S. Soliman, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 689 days.

(21) Appl. No.: 10/099,128

(22) Filed: Mar. 15, 2002

(65) Prior Publication Data

US 2003/0174067 A1  Sep. 18, 2003

(51) Int. Cl.  
*G08B 23/00*  (2006.01)

(52) U.S. Cl. ............... 340/870.02; 370/338; 455/11.1

(58) Field of Classification Search ......... 340/870.02, 340/870.11; 455/9, 11.1, 67.1; 370/338, 370/351  
See application file for complete search history.

(56) References Cited

U.S. PATENT DOCUMENTS

| | | | |
|---|---|---|---|
| 5,870,140 A | 2/1999 | Gillberry | 348/160 |
| 5,933,092 A * | 8/1999 | Ouellette et al. | 340/870.02 |
| 6,340,928 B1 * | 1/2002 | McCurdy | 340/436 |
| 6,552,525 B2 * | 4/2003 | Bessler | 324/103 R |
| 6,751,455 B1 * | 6/2004 | Acampora | 455/414.1 |
| 2002/0094799 A1 * | 7/2002 | Elliott et al. | 455/405 |
| 2003/0076241 A1 * | 4/2003 | Middleton | 340/870.02 |
| 2003/0134598 A1 * | 7/2003 | Sendrowicz | 455/67.1 |
| 2003/0202494 A1 * | 10/2003 | Drews et al. | 370/338 |
| 2004/0028023 A1 * | 2/2004 | Mandhyan et al. | 370/351 |
| 2004/0113810 A1 * | 6/2004 | Mason et al. | 340/870.02 |

FOREIGN PATENT DOCUMENTS

| | | | |
|---|---|---|---|
| DE | 10039430 | | 2/2002 |
| GB | 2237910 A | * | 5/1991 |
| WO | 0174045 | | 10/2001 |

* cited by examiner

Primary Examiner—Timothy Edwards, Jr.  
(74) Attorney, Agent, or Firm—Philip R. Wadsworth; Robert J. O'Connell

(57) ABSTRACT

A wireless remote telemetry system uses low-cost, low-power ad-hoc networks to provide flexible reading and control of remote devices. In an embodiment applicable to a utility service, consumption of electrical power among a population of customers is measured by a utility metering system having ad-hoc network communication capability. The remote metering unit transmits information over an ad-hoc network to one or more intermediate communication units or hops. The intermediate communication units or hops include a mobile unit, a mobile base unit, a subscriber home computer, and a home base unit. Each of these hops may co-exist in the same large-scale system. The intermediate communication units transfer the received information to a central controller through multi-hop ad-hoc networks or cellular networks, according to intelligent planning by the wireless infrastructure or the central unit.

4 Claims, 3 Drawing Sheets

METHOD AND APPARATUS FOR WIRELESS REMOTE TELEMETRY USING AD-HOC NETWORKS

BACKGROUND OF THE INVENTION

I. Field of the Invention

The present invention relates generally to wireless communications. More particularly, the present invention is directed to a novel and improved methods and apparatuses for the wireless metering of remote measurement devices using ad-hoc networks.

II. Description of the Related Art

Many industries utilize remote metering devices to monitor, measure, or record critical data. For example, utility companies use utility meters located at the customer site to measure utility consumption. The de-regulation of utility companies, such as electric power, water, and natural gas companies, has prompted these utility companies to seek technological modernization of equipment and services as a means of reducing costs in order to compete with other potential utility service providers.

In a conventional utility metering system, each utility customer is billed according to utility usage over a predetermined period of time, such as one or two months. An electro-mechanical meter having a visual display such as a set of dials, or an "odometer" type display measures the utility usage. A person, typically an employee of the utility company, periodically visits each utility meter in a service area to visually read the utility consumption as reported by the meter.

Several inefficiencies exist in conventional utility metering system. For example, the utility company must pay a person to travel to each meter to visually read it. This may require sending the meter reader into a dangerous area. It also takes a long time for a person to physically visit each meter. Additionally, most electro-mechanical meters may be opened and tampered with by a person wishing to reduce his utility bill. Since the meter is typically read only about once a month, the tampering may not be evident to the utility company. Another drawback to the conventional utility metering system is that local fault detection, such as the detection of a localized blackout or brownout condition, is not possible because the remote device is not measured or reported on a regular basis.

The problems facing the utility companies in this area are similar to problems facing companies in other industries that have a need to remotely monitor, measure or control a metering device or point-of-sale. For example, mail delivery companies, such as the U.S. Postal Service or the like, generally maintain a large number of mail drop-off points. Each day, these drop-off points must be checked to see if any mail has been deposited for delivery. Often times, especially in rural areas, there is no mail at the remote mailbox when the postal employee arrives to check it. The result is inefficient deployment of resources. Likewise, vending machine service providers send employees out to service remote vending machines according to a predetermined schedule, without knowing what the actual demand has been at the machine until the employee arrives. Clearly, there are many industries that face similar inefficiencies that arise from scheduled servicing of remote stations rather than event-driven demand-side management of these remote stations.

U.S. Pat. No. 5,748,104, issued May 5, 1998, entitled, "Wireless Remote Telemetry System," assigned to the assignee of the present invention, and incorporated herein by reference, discloses a remote telemetry method and system. However, the wireless portion of the infrastructure needs high power remote unit and elaborate network planning.

There is, therefore, a need for a remote telemetry system that avoids the disadvantages of the prior art telemetry systems by providing wireless telemetry data information in a low-cost and efficient manner. There is also a need for a "gateway" for providing advanced consumer services at the remote location.

SUMMARY OF THE INVENTION

The present invention provides a novel and improved wireless and remote telemetry system that uses ad-hoc networks to provide frequent reading and control of remote telemetry devices. For example, in an embodiment applicable to utility service, consumption of electrical power among a population of customers such as residential homes and commercial buildings, may be measured by a utility metering system having ad-hoc communication capability. The utility metering system communicates with a mobile unit over an ad-hoc network. The mobile unit then communicates with a central controller over an ad-hoc network and/or wireless communication systems.

The mobile unit receives information from the utility metering systems over an ad-hoc network, when the mobile unit comes to close proximity of a remote metering unit. The mobile unit may transmit the received information to the central controller regularly, on demand, at a low-traffic time period, or according to a predetermined schedule, which may be remotely set and adjusted by the wireless infrastructure or the central controller. The messages that the remote metering unit transmits to the central controller include utility consumption readings and fault status indications.

The system may provide various advanced services such as delivering rate information to the remote metering unit to shift demand during peak hours, remote notification of the building owner upon a fault condition in the utility service or metering system, and real-time control functions such as load balancing in order to minimize peak usage. The system also provides various techniques to manage the reporting load on the system during peak reporting times, such as during a widespread blackout. Furthermore, the remote metering unit may provide a gateway to advanced consumer services at the remote location. By providing wireless and automatic metering services, the utility company may decrease costs by avoiding labor-intensive sight-reading of meters.

The utility company may use the received data to monitor and adjust the load in response to surges and dips in demand. If these variations are detected early on, the supply may be adjusted or the demand shifted by pricing increases during peak usage times or direct control of remote appliances, thereby reducing the peak-to-average ratio. Information collected for individual customers may be processed in real-time to generate short and long-term usage forecasts. Simultaneous readings of multiple remote metering units throughout the distribution system provide location of service losses, thefts, leaks, and faulty or improperly measuring meters. Accurate feedback of usage behavior may be provided to customers in billing statements in order to more accurately target and control wasteful practices and satisfy conservation goals.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
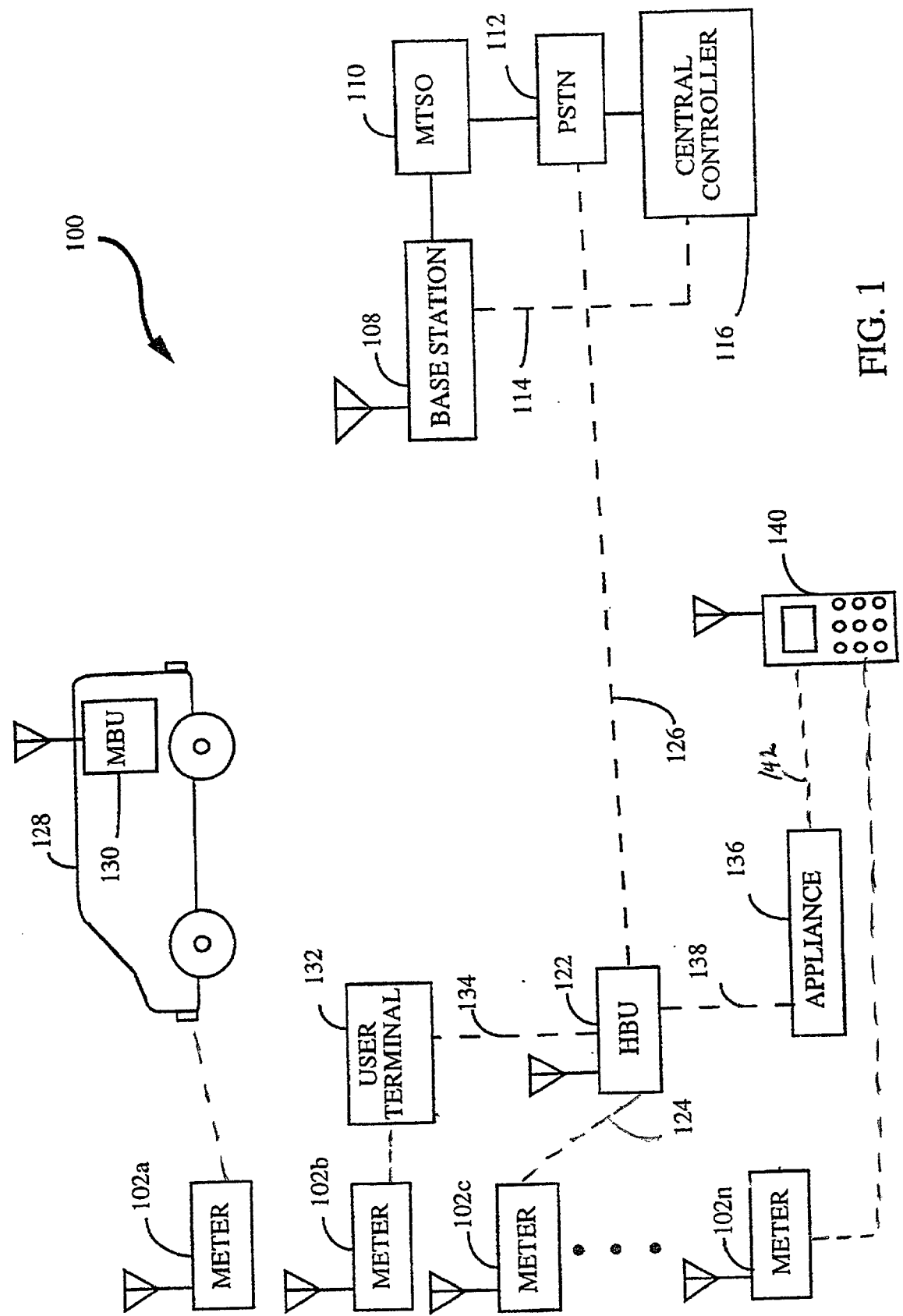
FIG. 1 is an overview of the remote telemetry system of the present invention, illustrated in block-diagram format.

FIG. 1 illustrates, in block diagram format, an overview of a remote telemetry system 100, according to one embodiment. It should be noted that although the present invention will be described with respect to electrical power service, its teachings are equally applicable to other utility companies, such as water and natural gas service providers, as well as other industries as previously discussed which have a need to remotely monitor, control, and/or service a remote station.

A plurality of remote metering units 102a–102n is respectively located at strategic points throughout the utility distribution network. For example, remote metering units 102a–102n may be located at residential homes and commercial buildings where the end-use of the utility service occurs. The mobile units may also be located at key distribution points such as substations and the like where larger-scale monitoring is desired. Remote metering units 102a–102n may be comprised of, for example, a basic transceiver coupled to a pre-existing conventional electromechanical utility meter by an interface device that is adapted to the type of meter (i.e. dial or odometer type). An advantage of this construction is that a small, low-cost, and easy to manufacture device may be readily adapted to be installed on pre-existing meters without costly system upgrading. Such a remote metering unit is described below with reference to FIG. 2.

In one embodiment, remote metering units 102a–102n each perform basic metering functions including reporting of utility service consumption, meter tampering detection and reporting, utility outage reporting, and detection and reporting of "surges" and "dips" in service levels. Remote metering units 102a–102n may transmit their reporting messages to central controller 116, through at least one base station 108 and a mobile telephone switching office (MTSO) 110, which may interface with the public switched telephone network (PSTN) 112. Central controller 116 may comprise, for example, a computer system and associated memory databases and interface circuitry that run application specific softwares for performing the control functions described herein. In various embodiments to be described below, various intermediate communication units or "hops" may be interposed between remote metering units 102a–102n and central controller 116 in a "mesh network" style. The intermediate communication units include a subscriber mobile unit 140, a mobile base unit 130, a subscriber home computer 132, and a home base unit 122. Each of these various embodiments may co-exist in the same large-scale system.

In one embodiment, base station 108 and MTSO 110 belong to a Code-Division Multiple Access (CDMA) spread spectrum communication system. An example of such a system is given in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS," assigned to the assignee of the present invention, and incorporated herein by reference. Additionally, the wireless communication system may be designed in accordance with Telecommunications Industry Association (TIA)/Electronic Industries Association (EIA) Interim Standard 95 (IS-95) entitled "Mobile Station-Base Station Compatibility Standard for Dual-Mode Wideband Spread Spectrum Cellular System," or the "TIA/EIA/IS-2000 Standard for cdma2000 Spread Spectrum Systems," hereinafter referred to as "the cdma2000 standard." Alternatively, the wireless communication system may be designed in accordance with ANSI J-STD-008, entitled "Personal Station—Base Station Compatibility Requirements for 1.8 to 2.0 GHz Code Division Multiple Access (CDMA) Personal Communications Systems." However, it should be noted that the teachings of the present invention are applicable to other wireless communication systems whether cellular or non-cellular, and regardless of the modulation scheme employed. For example, the present invention is equally applicable to Time-Division Multiple Access (TDMA) based systems such as the U.S. TDMA standard IS-54, or the pan-European standard Global System for Mobile Communications (GSM). Additionally, the teachings of the present invention are applicable to analog frequency modulation communication systems, such as the Advanced Mobile Phone System (AMPS).

In one embodiment, remote metering units 102a–102n transmit their respective reporting messages to an intermediate communication unit over an ad-hoc network. The advantages of using ad-hoc networks include flexibility in infrastructure architecture, no wireline connection, and flexible network topology. The ad-hoc networks allow the intermediate communication units be mobile, which may be carried by people or in automobiles, and low power. The intermediate communication units may interrupt metering units 102a–102n for any data transfer, without the need for network planning. The ad-hoc networks may be based on Bluetooth, IEEE 802.11, or ultra-wide-band communication protocols, for example.

Bluetooth communication protocol provides a simple and short range, e.g., 10 m to 100 m, radio-based solution for robust data and voice transfer without cables or the need for line of sight. It provides many advantages such as low complexity, low power consumption, low cost, frequency hopping, and time division duplex implementations. Bluetooth devices that come within the range of each other may dynamically set up ad-hoc point-to-point and/or point-to-multipoint wireless connections. This standard is suitable for battery-powered devices. Bluetooth communication protocol is well known in the art.

IEEE 802.11 communication protocol provides device-to-device connectivity on an ad-hoc basis in a wireless local area network (WLAN) environment. This wireless communication standard has higher data rates, longer range, e.g., up to 90, but higher power requirements. This standard is suitable for non-battery-powered devices. IEEE 802.11 communication protocol is well known in the art.

Ultra wide band communication protocol also provides device-to-device connectivity on an ad-hoc basis. It provides flexible, low cost implementation of direct communication for short distances, requiring no base station. This ad-hoc communication protocol is also well known in the art.

In one embodiment, mobile unit 140 may receive information from metering unit 102n, and transfer the received information to the base station 108, according to a planned data delivery scheme. The mobile unit may receive information from the metering unit 102n over an ad-hoc network when the mobile unit comes within the range of metering unit 102n. Persons or automobiles may advantageously carry the mobile unit. A person who is carrying the mobile unit may be walking, jogging, cycling, or delivering an item in the neighborhood of the metering unit 102n. The automobile that is carrying the mobile unit may include delivery vehicles, passenger vehicles, buses, and/or taxis. When such a mobile unit that is ad-hoc network-enabled comes within the range of an ad-hoc network-enabled metering device, the mobile unit may read and store information from the metering device. The mobile unit may then transfer the information to another wireless device or central controller autonomously or according to a planned data delivery scheme, which may be managed by the wireless infrastructure or the General Controller.

In one embodiment, mobile unit 140 may transfer the received information to base station 108 directly over a cellular communication network, such as a CDMA cellular network. The mobile unit may transfer the information at a low-traffic time period, periodically, or at the request of mobile station 108 or central controller 116.

In another embodiment, mobile unit 140 may transfer the received information to the central controller 116 over an ad-hoc network, or through multi-hop ad-hoc networks, when the mobile unit comes close to the central unit. Using multi-hop ad-hoc networks to transfer the information from the mobile unit 140 to the central controller 116 reduces transmission energy compared to single ad-hoc network.

In another embodiment, mobile unit 140 may transfer the received information to central controller 116 through binary runtime environment for wireless (BREW) protocol. BREW is an application platform that may be loaded on mobile unit 140 and central controller 116, for transferring information over the Internet. BREW protocol is well known in the art.

In another embodiment, mobile unit 140 may transfer the received information to base station 108 through an intermediate hop, such as HBU 122. The transmission from mobile unit 140 to HBU 122 may be over low-power cellular or ad-hoc network. Advantageously, mobile unit 140 does not need to consume high transmission power to communicate with HBU 122.

In another embodiment, mobile unit 140 may transfer the received information to central controller 116 through user terminal 132. The transmission from mobile unit 140 to user terminal 132 may be also over ad-hoc networks, as discussed above, when the mobile unit comes within the range of home computer 132. As discussed above, user terminal 132 may then transmit the received information to the central controller via the Internet, for example. Advantageously, mobile unit 140 does not need to consume high transmission power to communicate with user terminal 132.

In one embodiment, the information available at metering unit 102n may be relayed to base station 108 or central controller 116 by multiple mobile units. If one mobile unit is not capable of receiving entire information available at metering unit 102n, due to the mobility of the mobile unit, other mobile units coming within the range of metering unit 102n may pick up the remaining information, e.g., data packets, from metering unit 102n. In this embodiment, the data packets that are received at base station 108 or central controller 116 are grouped together based on some group identification, e.g., packet IDs.

In one embodiment, mobile base unit (MBU) 130 may be located in a vehicle 128 and driven to within communication range of remote metering unit 102a. This embodiment, which may be an alternative to mobile unit 140, may be used to augment coverage in rural areas that do not yet have wireless communication services installed. In this embodiment, MBU 130 may read measurement information from remote metering unit 102a over an ad-hoc network, as was described above in reference to other embodiments. MBU 130 may also comprise a separate computer (not shown) for data storage and post-processing instead of immediate transmission to base station 108 or central controller 116. In this embodiment, MBU 130 reads remote metering unit 102a as it drives by. MBU 130 may then transmit the received information to base station 108 or central controller 116 directly or through mobile unit 140, HBU 122, and/or user terminal 132.

In one embodiment, HBU 122 collects and transmits the reporting messages generated by remote metering unit 102c to base station 108. HBU 122 may receive the control messages, orders, and responses to reporting messages from base station 108, and relay them to remote metering unit 102c for action as required. However, it should be noted that in alternate embodiments, HBU 122 may utilize a pre-installed landline communication link 126 directly to the PSTN in order to communicate with central controller 116. This alternate embodiment would have the advantage of reduced cost of communication if a pre-existing landline communication link 126 already existed at the remote station. Additionally, HBU 122 may have an application interface that allows remote scheduling of automatic meter readings, automatic billing information transfer, and the like, based on control messages sent from central controller 116.

In one embodiment, HBU 122 may include an integrated RS-232 serial port, consumer electronic bus (CEBus) transceiver, or the like for interface, over link 134, to a user terminal 132. The user terminal may include a personal computer or a fax machine. Link 134 may also be an ad-hoc connection as discussed above. Thus, HBU 122 may serve as an interface for the customer to receive and display information sent from central controller 116 to HBU 122. For example, real-time billing data, account status inquiries, and various other value-added services, such as advertising services, may be displayed at user terminal 132. During peak utility usage hours, real-time pricing information may be communicated from central controller 116 to the customer at user terminal 122, prompting the customer to reduce his power consumption by turning off non-critical electrical equipments.

HBU 122 may also serve as a "gateway" for other services relating to home-integration and utility load management. For example, consider CEBus-compliant appliance 136 connected to HBU 122 via ad-hoc network connection or power line carrier (PLC) interface 138. Appliance 136 may be a lighting fixture, heating/air conditioning unit, security system, or home entertainment system, for example. During peak hours, central controller 116 may send control messages to appliance 136, or a group of appliances on a common bus, to turn off, thus reducing real-time power loading. Also, a customer could remotely activate and deactivate appliance 136 by sending control messages from mobile unit 140 to appliance 136 via base station 108 and HBU 122, or alternatively via ad-hoc network link 142.

In one embodiment, remote metering unit 102b may have an ad-hoc network interface with user terminal 132. In this embodiment, information measured at the metering device 102b may be transferred to the user terminal 132 regularly, on demand, as scheduled, or when a portable user terminal 132 comes within the range of metering unit 102b. The user terminal may process, store, and/or transfer the received information to the central controller through a global communication network, such as the Internet.

In each of the above-described embodiments, multiple remote metering units 102a–102n may simultaneously attempt to send a message through the intermediate "hops," i.e., mobile unit 140, computer terminal 132, HBU 122, or MBU 130), at the same time that other mobile subscriber units are also attempting to communicate with the base station. Thus, techniques for avoiding "collisions" between competing remote metering units 102a–102n are provided in the U.S. Pat. No. 5,748,104, incorporated in its entirety herein by reference.

Figure 2:
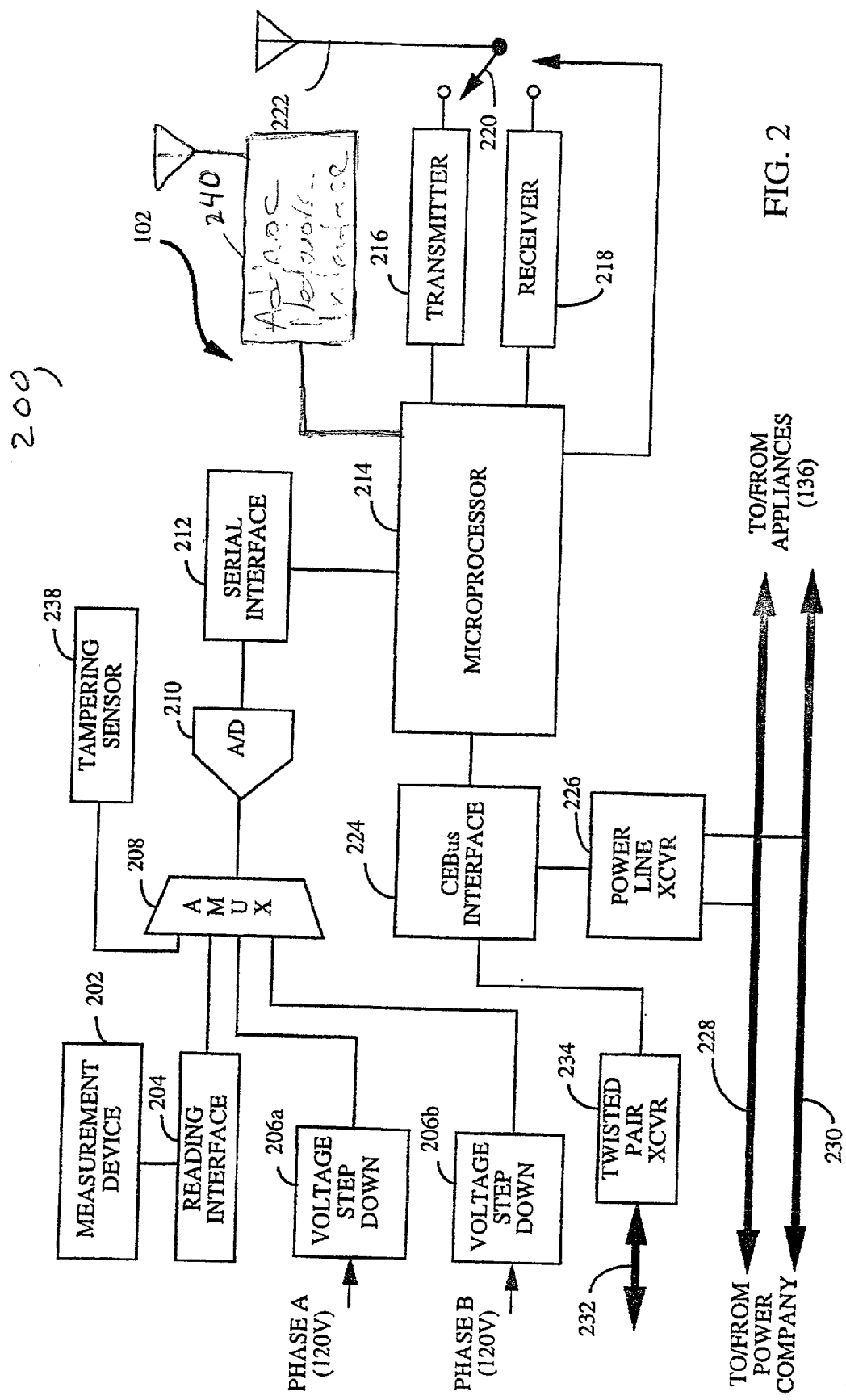
FIG. 2 is a block diagram of a remote metering unit, according to one embodiment.

Referring now to FIG. 2, a remote metering unit 200 is illustrated. In an embodiment applicable to electrical utility meter reading, measurement device 202 may be an electromechanical power consumption monitor and display of the rotating disk or odometer types as are known in the art. Reading interface 204 may then be an optical or electromechanical interface adapted to the type of measurement device 202 employed. For example, if measurement device 202 is an electro-mechanical rotating disk, then the number of revolutions of the disk is indicative of the power consumption. In such a case, reading interface 204 may comprise a light source and photocell that reads a single light pulse for every revolution of the disk. Reading interface 204 transforms the light pulses to analog electrical pulses and transmits them to analog multiplexer (AMUX) 208, where they are passed to analog-to-digital converter (A/D) 210. A/D converts the analog electrical pulses to a digital signal representative of the number of revolutions counted by reading interface 204, and passes the resulting digital signal to microprocessor 214. In response to the digital signal, microprocessor 214 calculates and stores the total consumption in kilowatt-hours. In the preferred embodiment, the storage interval may be selectable from about one-half hour to about one month.

According to a reporting schedule that may either be programmed locally or downloaded over paging channel 104 from central controller 116 (see FIG. 1), microprocessor 214 generates a utility consumption message for transmission to central controller 116. The consumption message is formatted by microprocessor 214 and then upconverted, modulated, amplified, and transferred to ad-hoc network interface unit 240, or alternatively transmitted by transmitter 216 over antenna 222. Note that in the latter embodiment, microprocessor 214 configures switch 220 for transmission only during times other than the assigned paging slot on paging channel, thereby enabling remote metering unit 102 to operate half-duplex without missing incoming messages from central controller 116. Alternately, switch 220 may be replaced by a conventional duplexer, as is known in the art, if half-duplex operation is not desired.

Central controller 116 as previously discussed transmits control and feedback messages intended for remote metering units 102a–102n. These messages may be transferred over ad-hoc network interface unit 240. Alternatively the messages may be captured by antenna 222, downconverted and demodulated by receiver 218, and passed to microprocessor 214 for appropriate action. Note that microprocessor 214 configures switch 220 for reception unless an outgoing transmission is required. The control messages sent by central controller 116 may include scheduling messages and acknowledgment of receipt of the various reporting messages transmitted by remote metering unit 102.

Additionally, in the exemplary embodiment of FIG. 2, voltage step-down transformers 206a and 206b are respectively coupled to the phase A and phase B electrical power lines at the customer site. In a typical electrical power installation in a residential home in the United States, the voltage level of both phase A and phase B is 120 volts. Step-down transformers 206a and 206b each output an analog voltage level signal that is proportional to the voltage sensed on phase A and phase B, respectively. The analog voltage level signals are passed to A/D 210 by AMUX 208, where they are subsequently converted to digital voltage level signals. The digital voltage level signals are then passed to microprocessor 214 through serial interface 212, where they are respectively compared with a maximum and a minimum voltage level threshold. In one embodiment, the maximum and minimum voltage level thresholds are programmable, and may be enabled or disabled via control messages from central controller 116, as required.

If the digital voltage level signal representing the voltage sensed on phase A, and the digital voltage level signal representing the voltage sensed on phase B are both between the maximum and minimum voltage level thresholds, then the voltage level regulation of phase A and phase B is satisfactory, and no action is taken. However, if either the digital voltage level signal representing the voltage sensed on phase A, or the digital voltage level signal representing the voltage sensed on phase B is not between the maximum and minimum voltage level thresholds, then the voltage level regulation of phase A and phase B is unsatisfactory, and microprocessor 214 generates a fault condition message for transmission to central controller 116 (see FIG. 1). Such a fault condition would occur if there were excessive "surges" or "dips" in the voltage level sensed on phase A or phase B, including if there were a local blackout or brownout. The fault condition message may contain an encoded representation of the actual voltage sensed on phase A and phase B. Microprocessor 214 may generate the fault condition message for transmission to central controller 116. Furthermore, central controller 116 may interrogate remote metering unit 102 and direct it to report not only the present consumption reading, but also the present voltage levels sensed on both phase A and phase B.

Additionally, in one embodiment as shown in FIG. 2, a tampering sensor 238 generates an analog tampering signal upon any attempted alteration or disconnection of remote metering unit 102. Tampering sensor 238 may be, for example, a mercury switch, or a proximity switch as is known in the art. This is desired in a utility metering application since tampering with the meter in order to "steal" utility service is very common. Since no person will be regularly visiting the remote metering unit 102 for visual inspection, the tampering sensor 238 is a security feature that enables remote detection of theft. The analog tampering signal is passed to A/D 210 through AMUX 208, where it is subsequently converted to a digital tampering signal. The digital tampering signal is passed to microprocessor 214 through serial interface 212. Microprocessor 214 may generate a fault condition message for transmission to central controller 116, or it may provide for memory storage of the digital tampering signal for delayed reporting. In case remote metering unit 102 is disconnected, the digital tampering signal is stored in memory for later retrieval.

In one embodiment as shown in FIG. 2, CEBus interface 224, power line transceiver 226, and twisted pair transceiver 234 are shown as being an integral part of remote metering unit 102. However, it should be noted that these "gateway" devices may be located at HBU 122 (see FIG. 1). Additionally, it should be noted that whether twisted pair transceiver 234 or power line transceiver 226 are located integrally to remote metering unit 102, or whether they would be present at all, may depend on the nature and configuration of the installation site. Also, it should be noted that although the CEBus interface 224, power line transceiver 226 and twisted pair transceiver 234 are shown as physically separate blocks in FIG. 2, they may be integrated into a single Very-Large Scale Integration (VLSI) Application Specific Integrated Circuit (ASIC), and even combined into microprocessor 214. VLSI ASIC techniques are well known in the art.

In one embodiment, CEBus interface 224 comprises a flash EPROM programmed with the specific application code required to run the various advanced services described herein. Additionally, CEBus interface 224 comprises non-volatile memory for storing CEBus system configuration parameters. Finally, CEBus interface 224 comprises the required circuitry for interfacing with microprocessor 214 and both power line transceiver 226 and twisted pair transceiver 234. For example, CEBus interface 224 may further comprise an embedded UART (not shown) for transmitting at higher data rates over twisted pair transceiver 234. CEBus controllers and interfaces are well known in the art. Power line transceiver 226 and twisted pair transceiver 234 each comprise the necessary circuitry to perform carrier modulation. This may include amplifiers, receivers, transformers, and various passive elements. Power line and twisted pair transceivers are also well known in the art.

In operation, control or informational messages originating in central controller 116, or alternately in mobile unit 140, may be received either through the ad-hoc network interface unit 240 or through receiver 218, and passed to microprocessor 214 where they are subsequently routed to CEBus interface 224. In response to the control or informational messages, CEBus interface 224 generates PLC encoded messages for transmission by either twisted pair transceiver 234 or power line transceiver 226, or both. The PLC encoded messages are transmitted on power lines 228 and 230 respectively, or on twisted pair line 232. CEBus-compliant appliance 136 receives the PLC encoded messages, decodes them, and takes appropriate action.

Figure 3:
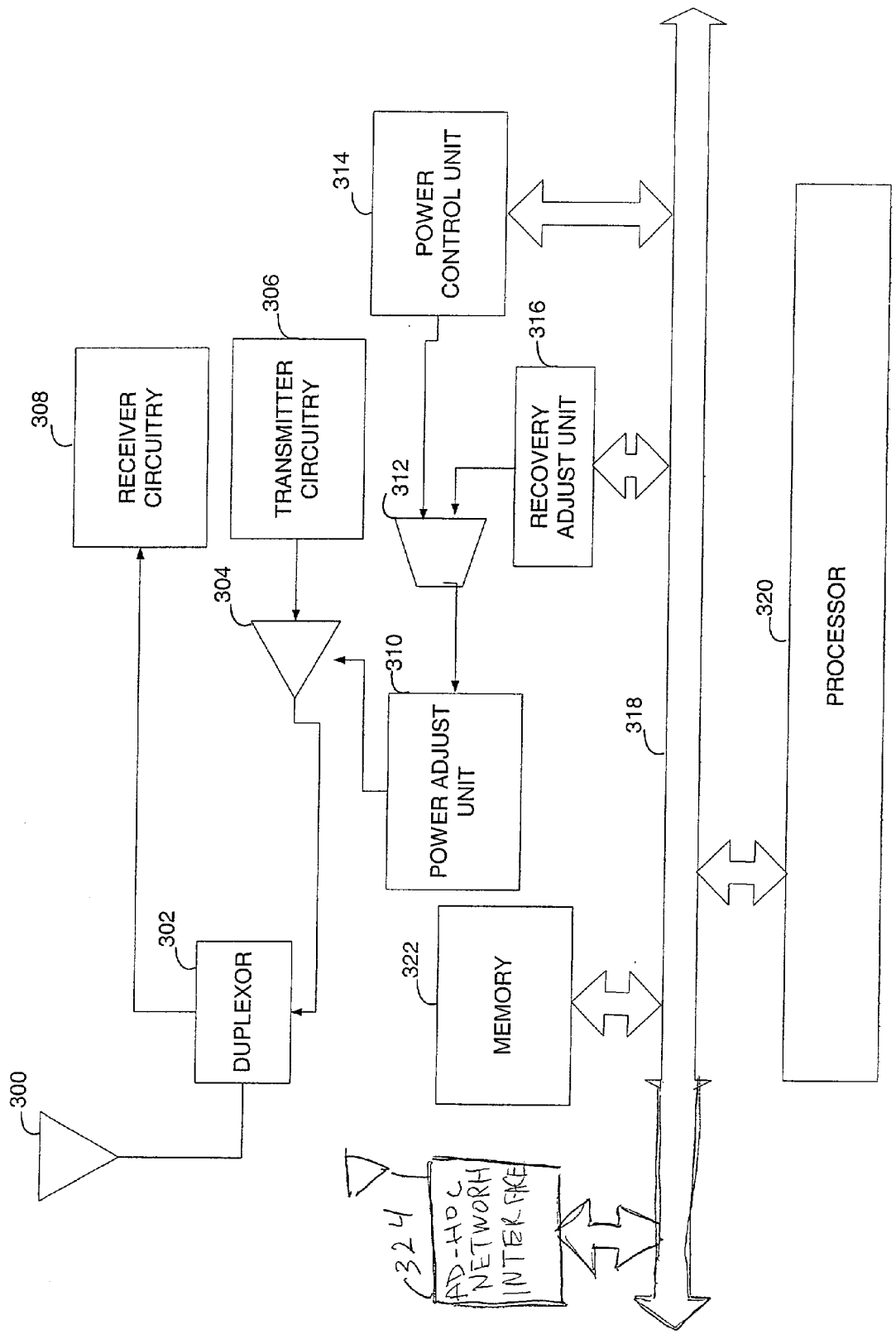
FIG. 3 is a block diagram of a mobile unit, according to one embodiment.

FIG. 3 shows one embodiment for mobile unit 140, such as a cell phone or a personal digital assistant (PDA), operating in system 100 of FIG. 1. Mobile unit 140 includes an antenna 300 for transmitting and receiving cellular voice and data. Antenna 300 is coupled to a duplexer 302 for isolating the receiver path from the transmitter path. The duplexer is coupled to the receiver circuitry 308 forming the receiver path and is coupled to an amplifier 304 and the transmit circuitry 306 forming the transmitter path. The amplifier 304 is further coupled to a power adjust unit 310 that provides the control of the amplifier 304. The amplifier 304 receives the transmission signals from the transmit circuitry 306.

Received cellular signals via antenna 300 are provided to a power control unit 314 that implements a closed loop power control scheme. The power control unit 314 is coupled to a communication bus 318. The communication bus 318 provides a common connection between modules within the mobile unit 140. The communication bus 318 is further coupled to a memory 322 and a recovery adjusts unit 316. The memory 322 stores computer readable instructions for a variety of operations and functions applicable to mobile unit 140. The processor 320 performs the instructions stored in memory 322. For normal operating conditions, the power control unit generates a power control signalt to a power adjust unit 310 via multiplex or 312. The power adjust unit 310 then transfers the power control signal as an amplification level to the amplifier 304.

Mobile unit 140 may receive and/or transmit information through an ad-hoc network interface 324, when mobile unit 140 comes within the range of another device that is equipped with an ad-hoc network interface. The information received through ad-hoc network interface 324 may be stored in the memory unit 322 and/or processed by the processor 320, which may be a digital signal processor (DSP).

According to one embodiment, transmission of information from the mobile unit may be periodically, on demand from the base station or central controller, or according to a planned scheme, which may be managed by the wireless infrastructure or the central controller. The wireless infrastructure may keep track of the position location and/or the movement profile of the mobile unit to manage data delivery from the mobile unit to the central controller. In one embodiment, when the mobile unit's current position information indicates that the mobile unit is in the proximity of the central controller or an intermediate wireless device, the mobile unit may be ordered to transfer the information to the central controller or the intermediate wireless device. This process manages the network resources better and saves battery life in the mobile unit compared to when the mobile unit transfers the information from a far distance to the central controller. In another embodiment, when the mobile unit's profile indicates the time of the day or the week that the mobile unit usually comes close to the central controller or the an intermediate wireless device, the mobile unit may be scheduled to transfer the information to the central controller or the intermediate wireless device according to the scheduled time. This intelligent planning for information transfer helps managing network resources and saves battery life in the mobile unit compared to when the mobile unit transfers the information from a far distance to the central controller or when network traffic is heavy.

Thus, the disclosed embodiments use low power, low-cost, and ad-hoc network-enabled wireless communication devices to provide flexible reading and control of remote telemetry devices, while providing advanced consumer services to customers. The wireless communication devices receive the measurement information from the metering devices, and transfer such information to the central controller, according to a planned data delivery scheme, thereby avoding expensive and high power transmitters and elaborate network planning.

The previous description of the embodiments is provided to enable any person skilled in the art to make or use the present invention. The various modifications to these embodiments will be readily apparent to those skilled in the art, and the generic principles defined herein may be applied to other embodiments. Thus, the present invention is not intended to be limited to the embodiments shown herein but is to be accorded the widest scope consistent with the principles and novel features disclosed herein.

What is claimed is:

1. A method for remote telemetry in a wireless communication system comprising of a telemetry device, a mobile unit, and a central controller, the method comprising:

receiving information from the telemetry device by the mobile unit over an ad-hoc network;

transmitting the received information to the central controller by the mobile unit, wherein the transmitting includes transmitting the information at a low-traffic time period; and transferring the received information to the central controller over at least one ad-hoc network.

2. The method according to claim 1 wherein the transmitting includes transmitting the information via a home base unit when the mobile unit comes within the range of the home base unit.

3. The method according to claim 1 wherein the transmitting the information includes transmitting the information via a home computer unit through the Internet.

4. The method according to claim 3 wherein the transmitting includes transmitting the information when the mobile unit comes within the range of the home computer unit.

* * * * *